United States Patent
Tomlinson

(10) Patent No.: US 10,358,856 B2
(45) Date of Patent: Jul. 23, 2019

(54) SOFT-STOP DEVICE AND SYSTEM

(71) Applicant: ASSA ABLOY Accessories and Door Controls Group, Inc., Monroe, NC (US)

(72) Inventor: William Holland Tomlinson, Mooreville, MS (US)

(73) Assignee: ASSA ABLOY Accessories and Door Controls Group, Inc., Monroe, NC (US)

( * ) Notice: Subject to any disclaimer, the term of this patent is extended or adjusted under 35 U.S.C. 154(b) by 0 days.

(21) Appl. No.: 15/405,709

(22) Filed: Jan. 13, 2017

(65) Prior Publication Data
US 2017/0204646 A1      Jul. 20, 2017

Related U.S. Application Data

(60) Provisional application No. 62/278,695, filed on Jan. 14, 2016, provisional application No. 62/364,270,
(Continued)

(51) Int. Cl.
*E05F 5/00*     (2017.01)
*E05F 3/10*     (2006.01)
(Continued)

(52) U.S. Cl.
CPC ............ *E05F 5/003* (2013.01); *E05D 15/063* (2013.01); *E05D 15/0626* (2013.01); *E05F 3/02* (2013.01);
(Continued)

(58) Field of Classification Search
CPC ..... E05F 5/003; E05F 5/10; E05F 3/00; E05F 3/02; E05F 3/18; E05Y 2900/132; E05Y 2201/21; E05Y 2201/264
See application file for complete search history.

(56) References Cited

U.S. PATENT DOCUMENTS

| 1,684,646 | A |   | 9/1928 | Snavely |
| 3,561,161 | A | * | 2/1971 | Green ................ E05F 3/02 16/80 |

(Continued)

FOREIGN PATENT DOCUMENTS

| DE | 202006006422 U1 | 8/2006 |
| DE | 102012009500 A1 | 11/2013 |

(Continued)

OTHER PUBLICATIONS

Pemko Manufacturing Co, International Patent Application No. PCT/US2017/040345, International Search Report and Written Opinion, dated Oct. 9, 2017.
(Continued)

*Primary Examiner* — Justin B Rephann
(74) *Attorney, Agent, or Firm* — Moore & Van Allen PLLC; Jeffrey R. Gray

(57) ABSTRACT

A damping system comprises a door panel operably connected to a rail for movement along the rail. An apparatus is mounted to the rail for damping movement of the door along the rail at an end position. The damping apparatus comprises a base defining a chamber having a closed end and an open end, the base configured for securing the damping apparatus to the rail. A piston is slidably mounted in the chamber and extends from the open end of the base in a first position. The piston includes a cylinder, a piston head moveable within said cylinder, a piston rod connected to the piston head, and a compression spring disposed on the piston rod between the cylinder and closed end of the chamber. The damping apparatus is secured to the rail for engaging and slowing movement of the door panel in a direction along the rail at the position as the piston is moved in the direction from the first position to a second position.

21 Claims, 16 Drawing Sheets

Related U.S. Application Data filed on Jul. 19, 2016, provisional application No. 62/411,040, filed on Oct. 21, 2016.

(51) Int. Cl.
 *E05D 15/06* (2006.01)
 *E05F 3/02* (2006.01)
 *F16F 13/00* (2006.01)

(52) U.S. Cl.
 CPC .............. *E05F 3/10* (2013.01); *F16F 13/007* (2013.01); *E05Y 2201/212* (2013.01); *E05Y 2201/418* (2013.01); *E05Y 2201/46* (2013.01)

(56) References Cited

U.S. PATENT DOCUMENTS

| | | | | |
|---|---|---|---|---|
| 4,471,575 | A * | 9/1984 | Stout | E05F 1/1066 16/80 |
| 5,468,042 | A * | 11/1995 | Heinrichs | E05C 17/305 16/51 |
| 6,052,867 | A * | 4/2000 | Haab | E05D 15/063 16/87 R |
| 6,438,795 | B1 * | 8/2002 | Haab | E05D 13/04 16/85 |
| 6,983,512 | B2 * | 1/2006 | De Oliveira | E05D 15/063 16/87 R |
| 7,100,907 | B2 | 9/2006 | Fitz et al. | |
| 8,215,061 | B2 * | 7/2012 | Gosling | E05F 5/10 49/137 |
| 8,402,606 | B1 * | 3/2013 | Tsai | E05F 3/18 16/49 |
| 9,027,283 | B2 * | 5/2015 | Beyerle | E05F 5/003 49/409 |
| 2005/0269176 | A1 * | 12/2005 | Tomiji | F16F 9/3405 188/284 |
| 2006/0207843 | A1 * | 9/2006 | Migli | E05F 5/02 188/282.1 |
| 2007/0158885 | A1 * | 7/2007 | Lam | E05F 5/02 267/34 |
| 2008/0217126 | A1 * | 9/2008 | Bantle | E05F 5/08 188/297 |
| 2008/0295283 | A1 | 12/2008 | Tice | |
| 2009/0044916 | A1 | 2/2009 | Singiser et al. | |
| 2009/0090587 | A1 * | 4/2009 | Tomita | F16F 9/065 188/282.6 |
| 2009/0094789 | A1 * | 4/2009 | Bereznai | E05F 5/10 16/84 |
| 2009/0260188 | A1 * | 10/2009 | Lange | E05C 17/305 16/412 |
| 2010/0212109 | A1 | 8/2010 | Kim | |
| 2011/0041284 | A1 * | 2/2011 | Kimura | E05F 1/16 16/49 |
| 2011/0099909 | A1 * | 5/2011 | Stommel | E05F 1/16 49/413 |
| 2011/0283478 | A1 | 11/2011 | Berry et al. | |
| 2012/0060419 | A1 * | 3/2012 | Riggs | E05B 65/0017 49/18 |
| 2013/0061425 | A1 * | 3/2013 | Inaguchi | E05F 5/003 16/85 |
| 2013/0167444 | A1 | 7/2013 | Ryden et al. | |
| 2013/0333292 | A1 * | 12/2013 | Beyerle | E05F 5/003 49/414 |
| 2014/0059801 | A1 * | 3/2014 | Saito | E05F 1/16 16/72 |
| 2015/0137436 | A1 * | 5/2015 | Fitterling | F16F 9/516 267/140.13 |

FOREIGN PATENT DOCUMENTS

| | | | |
|---|---|---|---|
| EP | 2218989 A2 | 8/2010 | |
| EP | 2286048 A1 | 2/2011 | |
| FR | 2267439 A1 | 11/1975 | |
| GB | 861627 A | 2/1961 | |
| GB | 2371326 A | 7/2002 | |
| JP | 2007182714 A * | 7/2007 | .............. E05F 5/003 |
| WO | 2006059860 A1 | 6/2006 | |
| WO | 2009132759 A1 | 11/2009 | |
| WO | 2009141044 A1 | 11/2009 | |
| WO | 2011121621 A1 | 10/2011 | |
| WO | 2015182468 A1 | 12/2015 | |

OTHER PUBLICATIONS

U.S. Appl. No. 15/639,625, filed Jun. 30, 2017.
International Search Report and Written Opinion, International Patent Application No. PCT/US2017/013384, dated Apr. 4, 2017.
U.S. Appl. No. 15/639,625, Office Action, dated Feb. 8, 2019.
ASSA ABLOY Accessories and Door Controls Group, Inc., International Patent Application No. PCT/US2017/040345, International Preliminary Report on Patentability, dated Jan. 10, 2019.

* cited by examiner

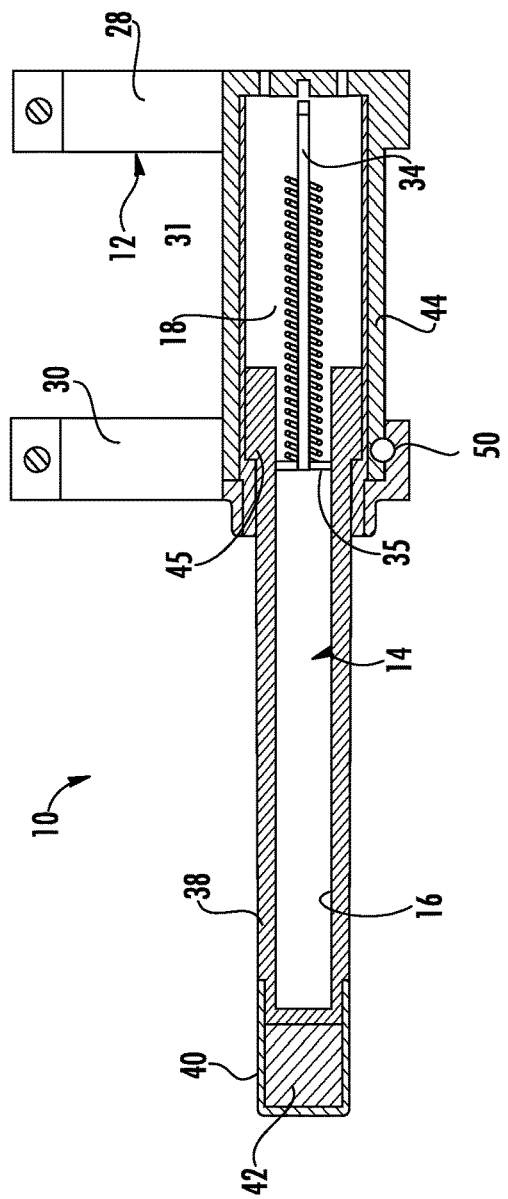
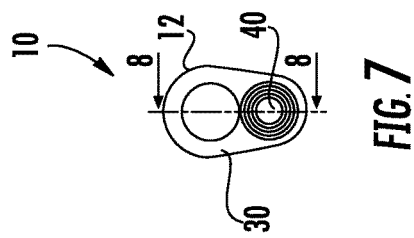

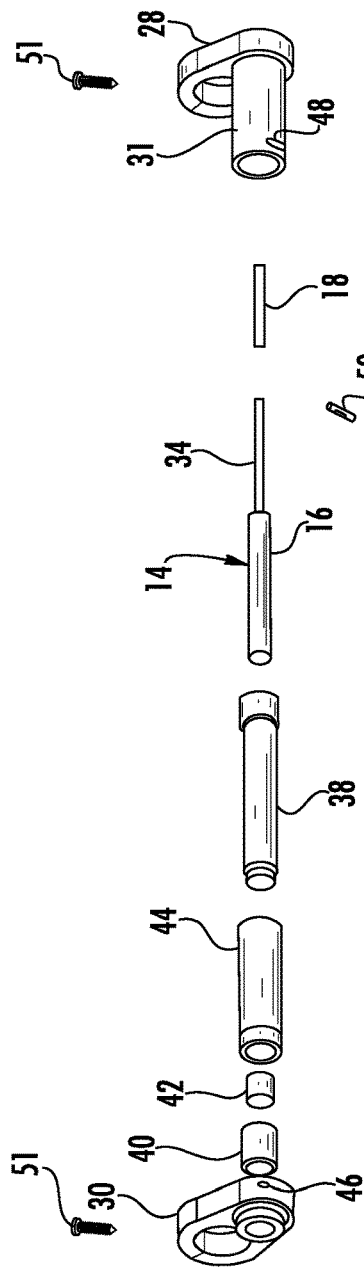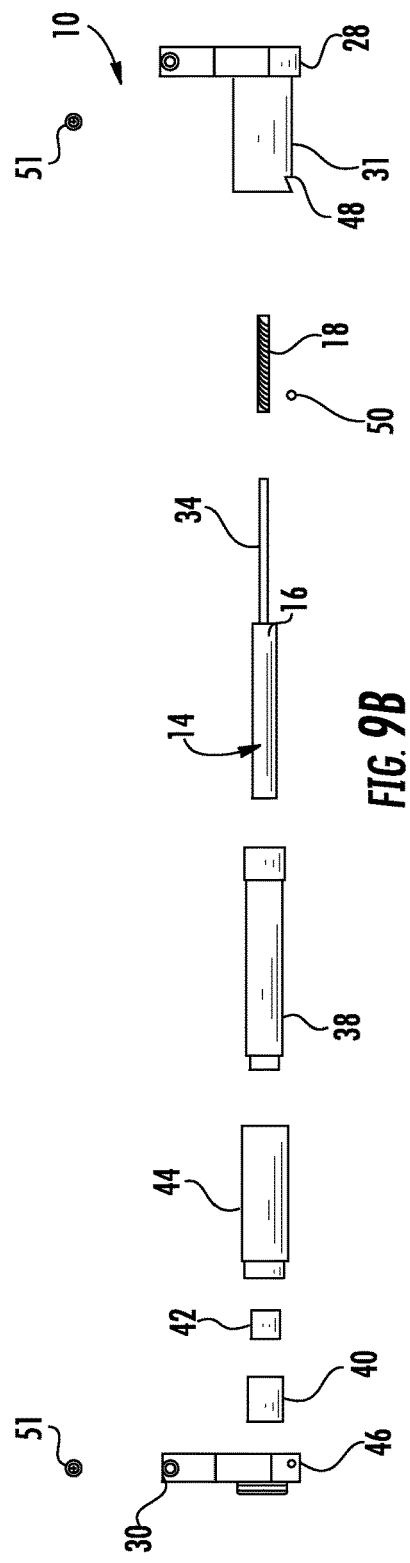

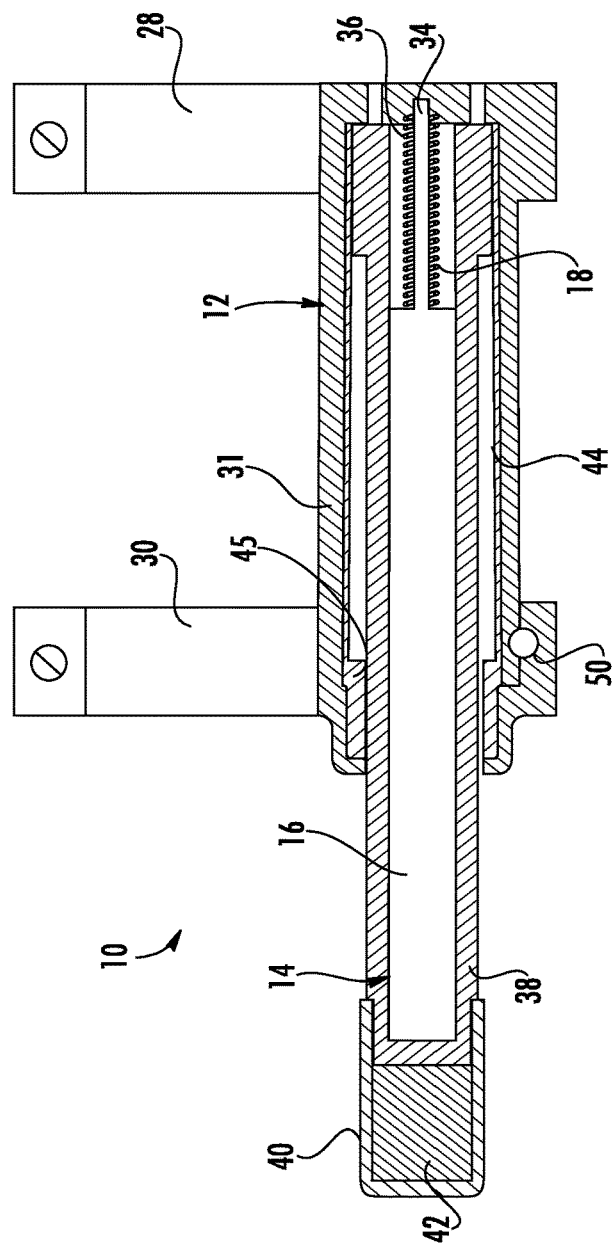
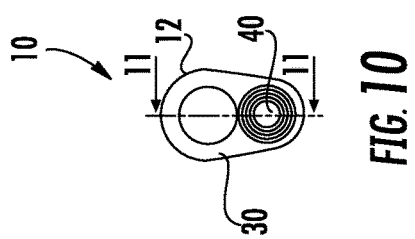

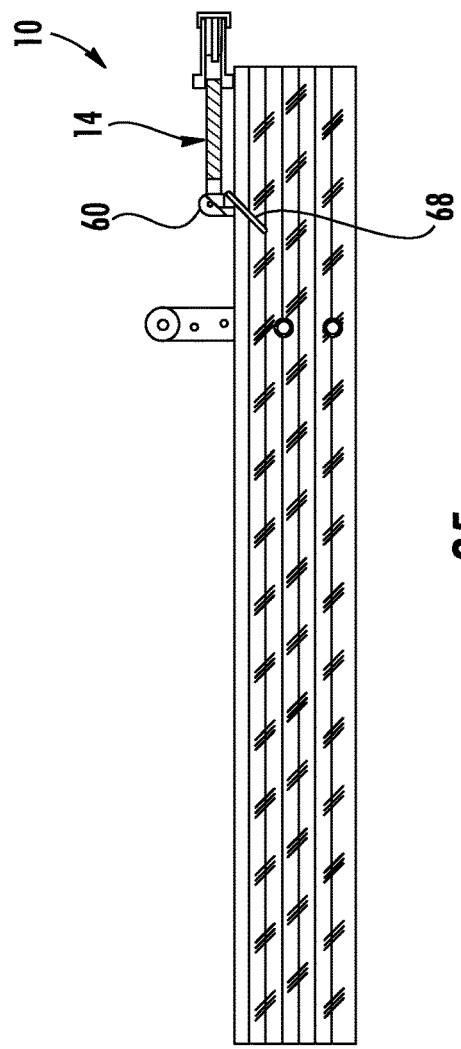
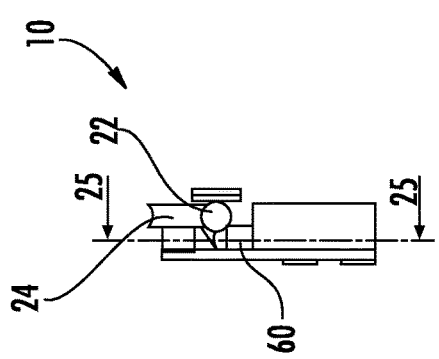

SOFT-STOP DEVICE AND SYSTEM

CROSS-REFERENCES

This application is related to U.S. provisional application Nos. 62/278,695, filed Jan. 14, 2016, 62/364,270, filed Jul. 19, 2016, and 62/411,040, filed Oct. 21, 2016, entitled "SOFT-STOP DEVICE AND SYSTEM", naming William Holland Tomlinson as the inventor. The contents of the provisional applications are incorporated herein by reference in their entirety, and the benefit of the filing date of the provisional applications is hereby claimed for all purposes that are legally served by such claim for the benefit of the filing date.

BACKGROUND

A soft-stop or damping device is described for use in a system that operates to slow and damp the movement of a door and, more particularly, a soft-stop device is described for slowing movement and providing a buffering effect to a rolling or sliding door at an end position.

Soft-stop and damping devices are increasingly being used in order to prevent a door from hitting a door frame when the door is shut too forcefully or at a high rate of speed. In one application, a soft-stop device is used with a rolling or sliding door panel. The rolling or sliding door panel can be manually moved along a rail between an opened or a closed position. The moving door panel can bump against the door frame or a wall at a door end position. A rapidly moving door panel can cause damage to the door panel or the door frame and risks injury to users.

A resilient buffering pad or block is sometimes mounted on the rail to keep a door panel from bumping against the door frame or the wall. The resilient buffering pad brakes the movement of the door adjacent the door end position for preventing damage to the door panel and the door frame. The pad or block may be combined with a mating attraction device, such as a magnetic member, to hold the door in the end position.

A problem with the resilient buffering pad or block is the rebounding force on the door panel when the door panel abuts with the pad or block. The door panel can rebound from the contact position due to the rebounding force, so that the rolling or sliding door cannot be positioned at the end position without manual intervention.

For the foregoing reasons, there is a need for a new soft-stop device for slowing the movement of the rolling or sliding door panel approaching an end position. The soft-stop device should absorb some of the forces exerted as the door is being closed and resist the motion of the closing door. The soft-stop device can be a part of a damping system designed to damp, resist and reduce the amount of speed and force of a rolling or sliding door panel to produce a soft, quiet opening or closing action.

SUMMARY

A damping system is provided and comprises a door frame at least partially defining an opening, an elongated rail horizontally mounted to the door frame above the opening, and a door panel operably connected to the rail for movement along the rail, the door panel sized and shaped to cover opening defined by the door frame in at least one position of the door panel along the rail. An apparatus is mounted to the rail for damping movement of the door along the rail at an end position. The damping apparatus comprises a base defining a chamber having a closed end and an open end. The base is configured for securing the damping apparatus to the rail. A piston is slidably mounted in the chamber and extends from the open end of the base in a first position. The piston includes a cylinder, a piston head moveable within said cylinder, a piston rod connected to the piston head, and a compression spring disposed on the piston rod between the cylinder and closed end of the chamber. The damping apparatus is secured to the rail for engaging and slowing movement of the door panel in a direction along the rail at the position as the piston is moved in the direction from the first position to a second position.

In one aspect, the damping system may further comprise a roller assembly mounted to the door, the roller assembly including a roller configured to run on the rail.

In another aspect, the damping system further comprises a catch secured to the roller assembly and arranged to engage the piston. The catch may alternatively be secured to the door panel and arranged to engage the piston.

In a further aspect, the base of the damping system comprises a plurality of brackets mounted to the rail in longitudinally spaced relationship.

In a still further aspect, the damping system further comprises a first magnet attached to the piston, and a second magnet attached to the door. The first magnet and the second magnet are oriented such that like poles are not facing each other and operate to create an attractive force as the magnets are move toward one another for holding the door panel engaged with the position. The first magnet and the second magnet may be substantially adjacent to one another at the end position. In one embodiment, the second magnet is disposed in the catch.

In a further embodiment of the damping system, the damping apparatus comprises a plurality of damping devices at each end position of the door panel.

A damping device is also provided for use with a door panel operably connected to a rail for movement along the rail for damping movement of the door along the rail at an end position. The damping device comprises a base defining a chamber having a closed end and an open end, the base being adapted for securing the damping device to the rail. A piston is slidably mounted in the chamber and extends from the open end of the base in a first position. The piston includes a cylinder, a piston head moveable within said cylinder, a piston rod connected to the piston head, and a compression spring disposed on the piston rod between the cylinder and closed end of the chamber, the compression spring operable to create resistance forces as the compression spring is compressed. The piston is secured to the rail for engaging and slowing movement of the door panel in a direction along the rail at the end position as the piston is moved in the direction from the first position to a second position.

In one aspect of the damping device, the cylinder has one or more perforations operable to allow air to escape from the chamber.

In another aspect, the damping device is a pneumatic device and the cylinder accommodates a pneumatic medium as an operating fluid to cause fluid damping. The pneumatic medium may be air or hydraulic fluid.

In a further aspect, the damping device further comprises a sleeve in the chamber for guiding displacement of the piston rod, the sleeve comprising an annular skirt.

BRIEF DESCRIPTION OF THE DRAWINGS

For a more complete understanding of the soft-stop device, reference should now be had to the embodiments shown in the accompanying drawings and described below. In the drawings.

FIG. 7 is an end elevation view of the soft-stop device as shown in FIG. 4.

FIG. 8 is a longitudinal cross-section view of the soft-stop device as shown in FIG. 4 and taken along line 8-8 of FIG. 7 showing the soft-stop device in a first extended position.

FIG. 9A is an exploded perspective view of the soft-stop device as shown in FIG. 4.

FIG. 9B is an exploded side elevation view of the soft-stop device as shown in FIG. 4.

FIG. 10 is an end elevation view of the soft-stop device as shown in FIG. 4.

FIG. 11 is a longitudinal cross-section view of the soft-stop device as shown in FIG. 4 and taken along line A-A of FIG. 10 showing the soft-stop device in a second compressed position.

FIG. 24 is a partial end elevation of the soft-stop device with the catch as shown in FIG. 21 attached to the door.

FIG. 25 is a transverse cross-section view of the soft-stop device and catch on the door as shown in FIG. 24 taken along line 25-25 of FIG. 24.

DESCRIPTION

Certain terminology is used herein for convenience only and is not to be taken as a limiting. For example, words such as "upper," "lower," "left," "right," "horizontal," "vertical," "upward," "downward," "top" and "bottom" merely describe the configurations shown in the FIGs. Indeed, the components may be oriented in any direction and the terminology, therefore, should be understood as encompassing such variations unless specified otherwise. The words "interior" and "exterior" refer to directions toward and away from, respectively, the geometric center of the core and designated parts thereof. The terminology includes the words specifically mentioned above, derivatives thereof and words of similar import.

Figure 1:
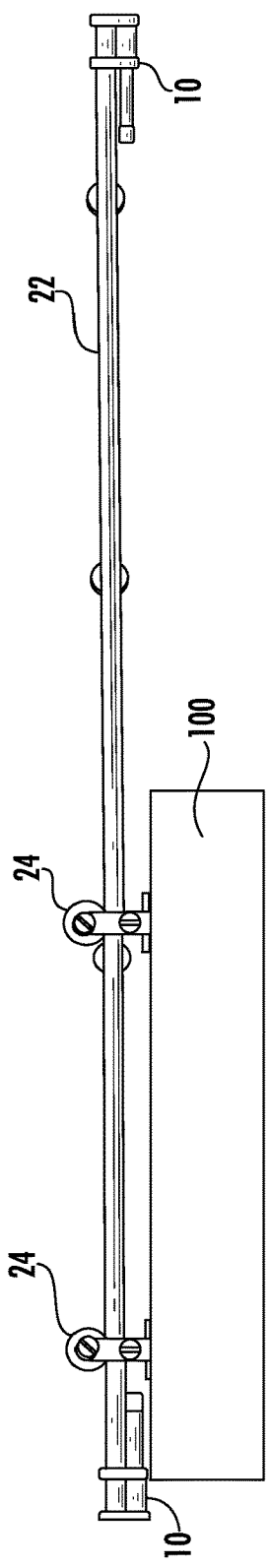
FIG. 1 is a schematic front elevation view of a rolling door system with a portion of a door panel cut-away including a soft stop-stop device at each end position of the door panel.
Figure 2:
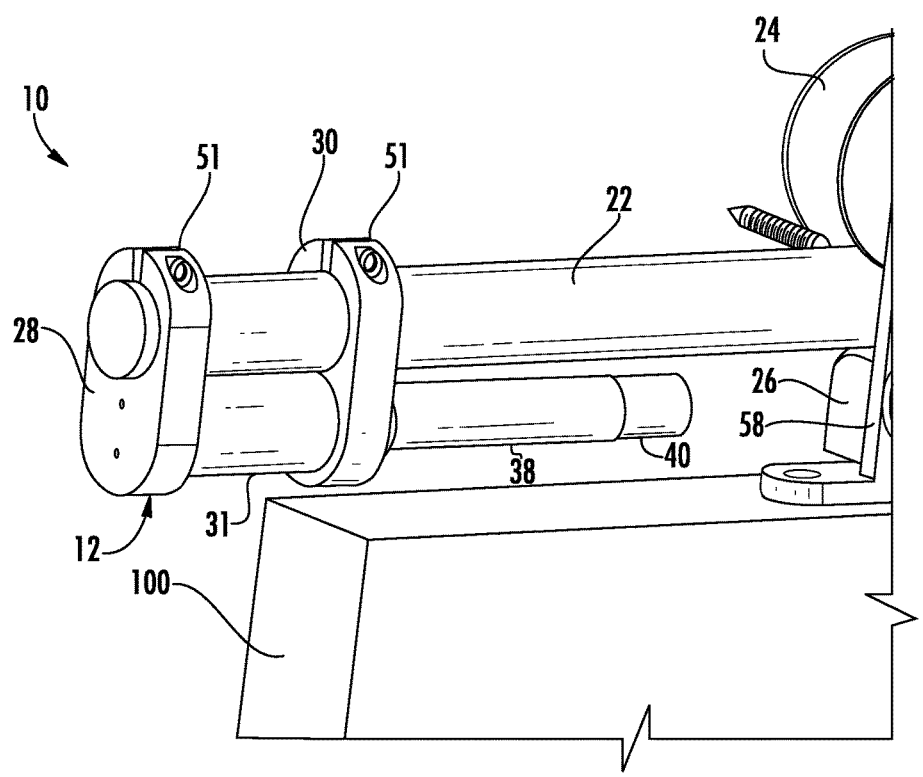
FIG. 2 is a front perspective view of a soft-stop device at the left end position of the door panel as shown in FIG. 1.
Figure 3:
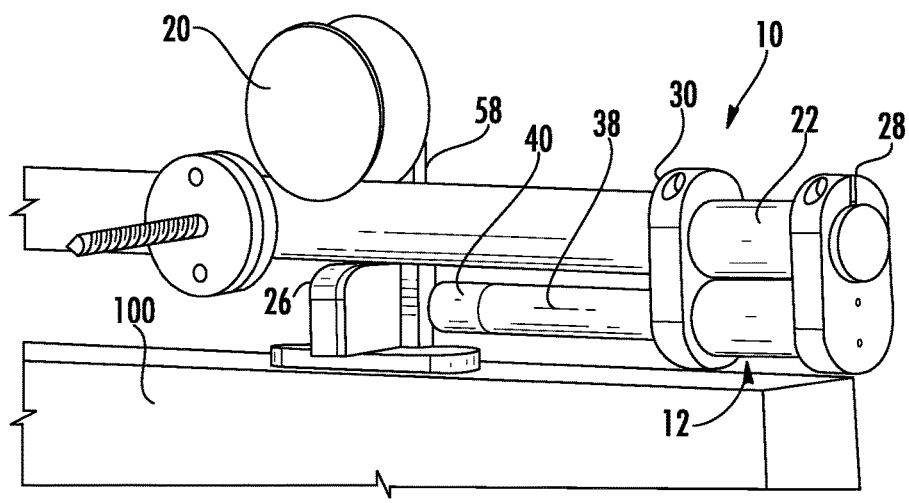
FIG. 3 is a rear perspective view of the soft-stop device at the left end position of the door panel as shown in FIG. 2.
Figure 4:
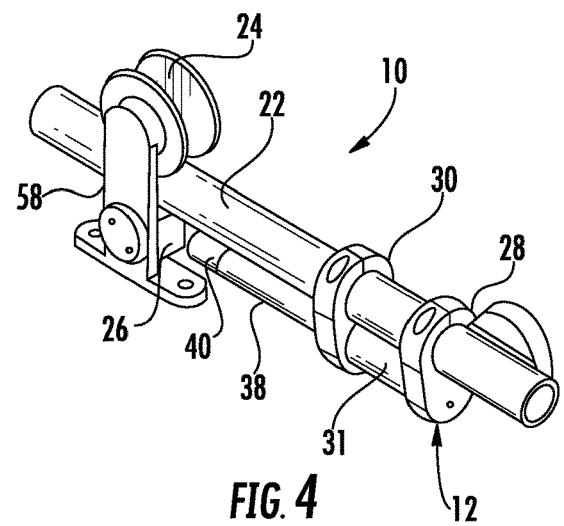
FIG. 4 is a perspective view of an embodiment of a soft-stop device mounted on a portion of a rail and adjacent to a roller assembly on the rail.
Figure 5:
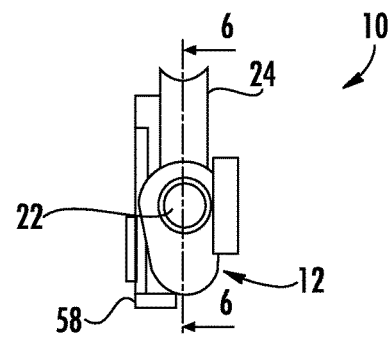
FIG. 5 is an end elevation view of the soft-stop device, roller assembly and rail as shown in FIG. 4.
Figure 6:
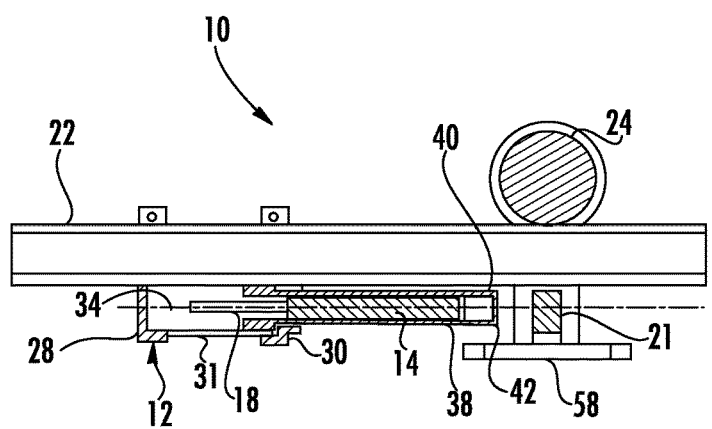
FIG. 6 is a longitudinal cross-section view of the soft-stop device, roller assembly and rail shown in FIG. 4 and taken along line 6-6 of FIG. 5.
Figure 12:
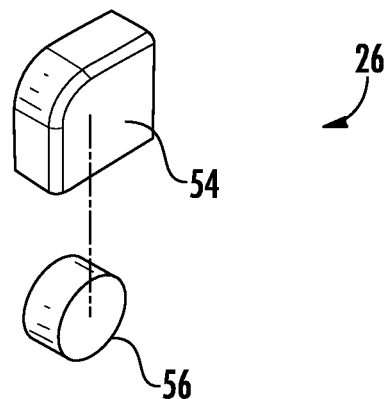
FIG. 12 is an exploded perspective view of an embodiment of a catch for use with the soft-stop device as shown in FIG. 4.
Figure 13:
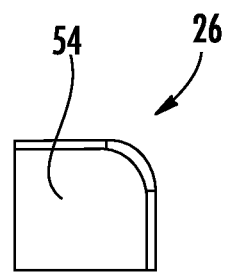
FIG. 13 is a side elevation view of the catch as shown in FIG. 12.
Figure 14:
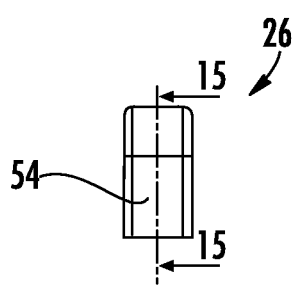
FIG. 14 is an end elevation of the catch as shown in FIG. 12.
Figure 15:
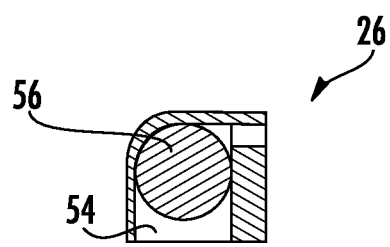
FIG. 15 is a longitudinal cross-section view of the catch as shown in FIG. 12 and taken along line 15-15 of FIG. 14.
Figure 16:
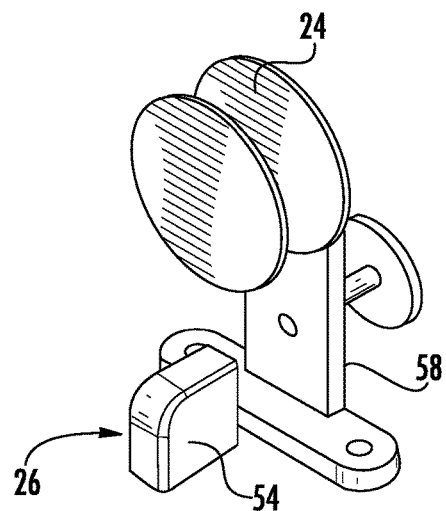
FIG. 16 is a front exploded perspective view of the catch as shown in FIG. 12 and a roller assembly.
Figure 17:
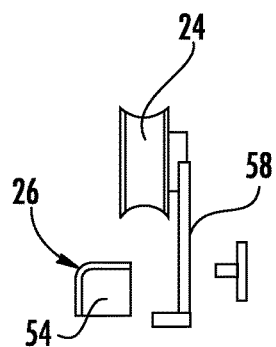
FIG. 17 is an exploded side elevation view of the catch and roller assembly as shown in FIG. 16.
Figure 18:
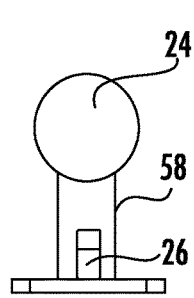
FIG. 18 is a front elevation view of the catch as shown in FIG. 12 attached to the roller assembly.
Figure 19:
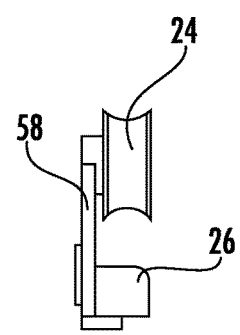
FIG. 19 is a side elevation view of the catch attached to the roller assembly as shown in FIG. 18.

Referring now to the drawings, wherein like reference numerals indicate the same or similar elements throughout the several views, a soft-stop device for use with a rolling or sliding door system is shown in FIGS. 1-3 and generally designated at 10. The rolling or sliding door system includes at least one door panel 100 and a rail system 102 having at least a first rail 22. A plurality of roller assemblies are attached to the top edge of the door panel 100 and rollers 24 which guide movement of the door panel 100 along the rail 22. As shown in FIG. 1, a soft-stop device 10 is secured to each end of the rail 22 for engaging a roller 24, a roller assembly or other component mounted on the door panel 100, such as a catch 26.

Referring to FIGS. 2 and 3, the soft-stop device 10 is positioned on the rail 22 adjacent to one end position of the door 100, such as where the door reaches an open position or a closed position. As will be described more fully below, the soft-stop device 10 operates to slow and damp movement of the door panel 100 along the rail 22. In a first extended position of the soft-stop device 10, a portion of a proximal end of a damping device extends from a sleeve. As the door panel 100 is being moved, the catch 26 mounted on, for example, the end roller assembly contacts the damping device. As the door panel 100 continues moving, the damping device is forced into the sleeve, moving from the extended position to a second compressed position as a force created by the moving door panel 100 is exerted upon the damping device. The damping device is forced into the sleeve causing a spring 18 within the sleeve to compress. This creates a resistance force against the forces exerted by the moving door panel 100 for damping and slowing the movement of the door panel. In one embodiment, a magnetic catch 42 holds the door panel 100 engaged with the damping device in the end position. Typically, the soft-stop device 10 returns to the first position with the damping device returning to the extended position under force of the spring 18 while maintaining the door panel 100 in the end position. In the case of some heavier door panels, the damping device may not reach the fully extended position. In this circumstance, as the door panel 100 is pushed or pulled away from the soft-stop device 10, the force exerted by the weight of the door panel 100 is released and the damping device is able to extend out of the sleeve to the first position as the spring 18 decompresses.

Referring now to FIGS. 4-9B, the soft-stop device 10 comprises a base 12 and a piston 14, including a piston rod 34 linearly displaceable within a cylinder 16, a resilient spring member 18 disposed on the piston rod 34, and a piston case 38 housing the piston 14. The base 12 includes a rear mounting clamp 28 and a front mounting clamp 30. Each of the rear mounting clamp 28 and the front mounting clamp 30 defining circular openings 27, 29 at each end. The openings 27 at one end of the mounting clamps 28, 30 are configured for receiving the rail 22. The openings 29 at the other end of the mounting clamps 28, 30 are configured to receive and support the piston 14 on the rail 22. The piston opening 29 in the rear mounting clamp 28 is further defined by a hollow cylindrical extension 31 projecting transversely forwardly from the rear mounting clamp 28. The proximal end of the extension 31 is closed. The distal end of the extension 31 is received in a corresponding circular groove 33 in the rear surface of the front clamp 30 (FIG. 8) such that the openings in the clamps 28, 30 are coaxially aligned through the extension 31. The front mounting clamp 30 has a transverse hole 46 opening into the groove 33 for receiving a spring pin 50. The cylindrical extension 31 has partial circumferential recess 48 adjacent the distal end. The circumferential recess in the extension 31 is aligned with the hole 46 in the front clamp 30 when the mounting clamps 28, 30 are joined. The spring pin 50 inserted into the hole 46 in the front mounting clamp 30 fits into the recess 48 at the distal end of the cylindrical member 31 for securing the end of the cylindrical member 31 in the front mounting clamp 30. A screw 51 extends through threaded holes 53 spanning the legs of the mounting clamps 28, 30 for securing the mounting clamps 28, 30 to the rail 22. As shown in FIGS. 1-3, the soft-stop device 10 is secured to the rail 22 such that the piston 14 extends in a direction generally parallel with the longitudinal axis of the rail 22.

As best shown in FIGS. 8-9B, a piston case 38 defines a blind cylindrical bore 36 for receiving the cylinder 16. A length of the outer surface of the distal end of the piston case 38 is threaded for securing a threaded cap 40 holding a magnet 42 against at the distal end of the piston case 38. A hollow nylon sleeve 44 is optionally provided and configured to be disposed in the cylindrical extension 31 and into the aligned openings 29 of the mounting clamps 28, 30. The nylon sleeve 44 comprises an elongated tubular body configured for receiving and supporting linear reciprocal movement of the piston case 38 for preventing sliding metal-to-metal contact. A portion of the proximal end of the piston case 38 has a larger diameter and is configured to slidingly engage the inner surface of the sleeve 44. Similarly, a portion of the distal open end of the sleeve 44 includes an inner flange 45 configured to slidingly engage the piston case 38 for linear reciprocation relative to the sleeve 44. The inner flange 45 of the sleeve 44 functions to prevent the widened end of the piston case 38 from sliding out of the sleeve 44.

Figure 20:
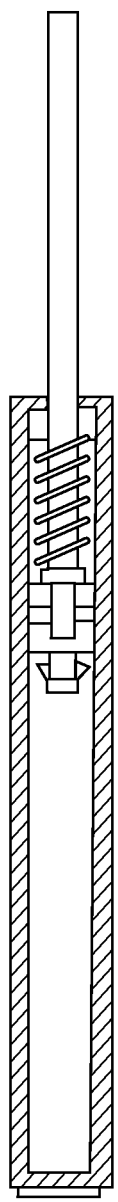
FIG. 20 is a side elevation view of an embodiment of a piston for use with the soft-stop device as shown in FIG. 4.

An embodiment of the piston 14 is shown in FIG. 20. The piston 14 includes a cylinder 16 and a piston rod 34 extending from inner end of the cylinder 16 and connected to a piston head 35 within the cylinder 16. The cylinder 16 comprises a housing for slidably receiving the piston head 35 and the piston rod 34. The piston rod 34 and piston head 35 form a plunger which is sized and shaped for linear reciprocation relative to the cylinder 16. In one embodiment, the piston 14 can be a pneumatic damping device for providing a damping, resistive force to movement of the piston head 35 and piston rod 34 when driven into the cylinder 16 housing. In the embodiment shown in FIG. 20, the piston 14 is a hydraulic damping device having compression direction damping and active return with a force ranging from about 5 Newtons up to about 45 Newtons. The piston rod 34, piston head cylinder 16 may be made out of any suitable rigid material resistant to deforming when force is exerted upon them. Such suitable material may include but not be limited to, for example, metal, plastic, fiberglass, PFTE, or a combination thereof.

The coil compression spring 18 is disposed over the end of the piston rod 34 between the inner end of the cylinder 16 and the inner surface of the closed proximal end of the extension 31 of the rear mounting clamp 28. The inner end of the piston rod 34 is received in an opening 52 in the inner surface of the extension 31. The length of the compression spring 18 is adapted such that the spring 18 extends from the inner end of the cylinder 16 to an intermediate point along the length of the piston rod 34 when the soft-stop device is in the first extended position (FIG. 8). As the moving door panel 100 exerts force upon the soft-stop device 10 causing the piston rod 34 to retract into the cylinder 16, the spring 18 is compressed generating a resistive force against the exerted forces of the moving door panel thereby damping and reducing the speed of the door panel 100. Various compression springs having different amounts of stored mechanical energy may be used depending on how much resistance is desired to dampen and slow the moving door panel. In one embodiment, the compression spring 18 may only be necessary for aiding return of the piston to an extended position for a heavier door.

The catch 26 is provided for mounting to the door panel 100 or other component on the door panel for engaging the soft-stop device 10. In one embodiment, the catch 26 functions to hold the door panel 100 in a fixed stopped position in engagement with the soft-stop device 10. In this embodiment, shown in FIGS. 12-15, the catch 26 comprises a body 54 defining a recessed cavity 55 in which is mounted at least one magnet 56. The magnets 42, 56 in the soft-stop device 10 and the catch 26, respectively, may be formed of any suitable magnetically conductive material and charged with magnetic poles of alternating polarity for generating magnetic-adhering faces, i.e., "positive" and "negative" faces. Accordingly, the magnets 42, 56 are mutually magnetically attracted upon engagement when the door panel 100 is approaching its end position. If both of the magnets are permanent magnets, they are mounted such that they are attracted to one another, i.e. one magnetic member is mounted with its positive face exposed and the other magnetic member is mounted with its negative face exposed. Depending on the size or weight of the door panel 100 and the magnetic force necessary to close that particular door, multiple first and second magnetic members may be used to effectively close the door.

The catch 26 may be mounted to a roller assembly 58 (FIGS. 16-19). In this arrangement, the catch 26 can replace and perform the function of an anti-rise pin in the rolling door system. Regardless of mounting position, the catch 26 is disposed to adjacent to the distal end of the piston case 38 in an end position of the door panel 100. The catch 26 is arranged on the roller assembly 58 so as the door reaches an end position, the catch 26 will contact the cap 40 on the end of the piston case 35 and the magnets 42, 56 are engaged. In this embodiment, the soft-stop device 10 thus serves to capture the catch 26 when brought into close proximity with the distal end of the soft-stop device 10 as the door panel 100 is moved to its end position. The soft-stop device 10 holds the door in the end position until pulled away by a user. Accordingly, magnets 42, 56 in tandem with the soft-stop device 10 function to gently and quietly stop and hold the door panel 100.

In use, a rolling or sliding door panel 100 is mounted on a rail 22. The rolling door panel 100 will typically have a plurality of roller assemblies 58, including wheels adapted to run on the rail 22. The soft-stop device is mounted to the rail 22 and the catch 26 is mounted on a roller assembly 58 for movement with the door panel 100. When no force is exerted upon the soft-stop device 10, the spring 18 is not compressed and the piston case 38 extends out of the sleeve 44 in the mounting clamps 28, 30 in the first extended position (FIG. 8). In this position, the wider proximal end 39 of the piston case 38 contacts the inner flange 45 of the sleeve 44. When a user moves the door panel 100 toward an end position and the soft-stop device 10, the catch 26 contacts the cap 40 at the distal end of the piston case 38. Force is exerted on the piston case 38 and the piston rod 34 is forced into the cylinder 16. The spring 18 engages the inner surface of the extension 31 of rear mounting clamp 28 and compresses as the piston rod 34 is driven into the cylinder 16. Damping resistance is created by the pneumatic or hydraulic pressure in the cylinder 16 and the spring 18 as it compresses. The resistive force acts against the moving door panel 100 such that the movement of the door panel 100 damped and slowed eventually to a stop. By slowing movement of the door panel 100, any noise or slamming of the door, as would occur if the door was suddenly stopped by the wall, will be minimized if not completely avoided. As the spring 18 compresses and the door panel 100 stops moving to the end position, the soft-stop device 10 is in the second compressed position (FIG. 11). The compression spring 18 returns the soft-stop device 10 to the first extended position with the door panel 100 in the end position. The user may move the door panel 100 away from the soft-stop device 10 to other an end position. The soft-stop device 10 will remain in the first extended position as the door panel moves away In the embodiment wherein the soft-stop device 10 and the catch 26 hold magnets 42, 56, the magnets 42, 56 attract each other and hold contact of the catch 26 and the piston case 38. With this arrangement, attraction of the magnets prevents a rebound effect from being applied to the door panel 100. In this arrangement, the compression spring 18 will return the soft-stop device 10 to the first extended position with the catch 22 and piston case 38 engaged. The user may move the door panel 100 away from the soft-stop device 10 by overcoming the magnet attraction of the catch 26 and the soft-stop device 10. The soft-stop device 10 will remain in the first extended position as the door panel moves away The soft-stop device 10 is particularly useful in a retrofit situation as the device may be secured to an existing rail 22 and roller assembly 58. Although a single soft-stop device 10 is shown in the FIGs., depending on the size and weight of the door panel 100 multiple soft-stop devices 10 may be mounted on the rail 22 or the door frame to more effectively damp the motion of a moving door panel to produce a damping effect based upon the given application.

Figure 21:
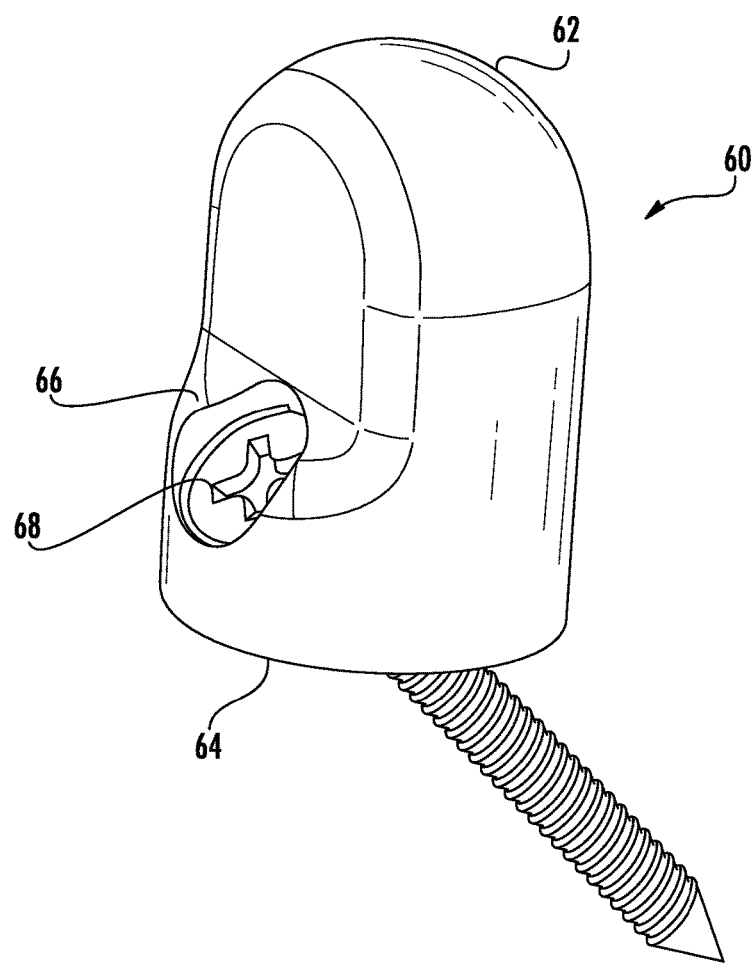
FIG. 21 is a perspective view of another embodiment of a catch for use with the soft-stop device as shown in FIG. 4.
Figure 22:
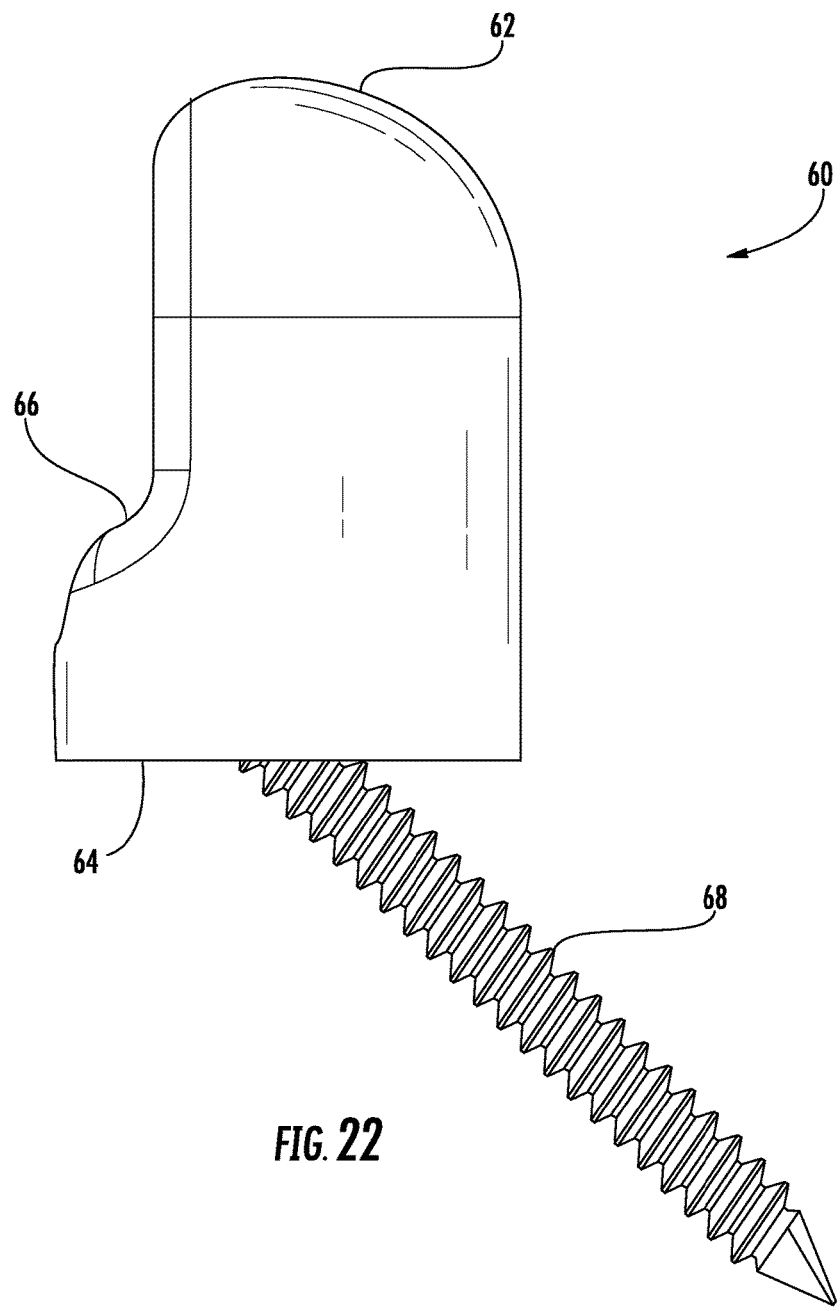
FIG. 22 is a side elevation view of the catch as shown in FIG. 21.
Figure 23:
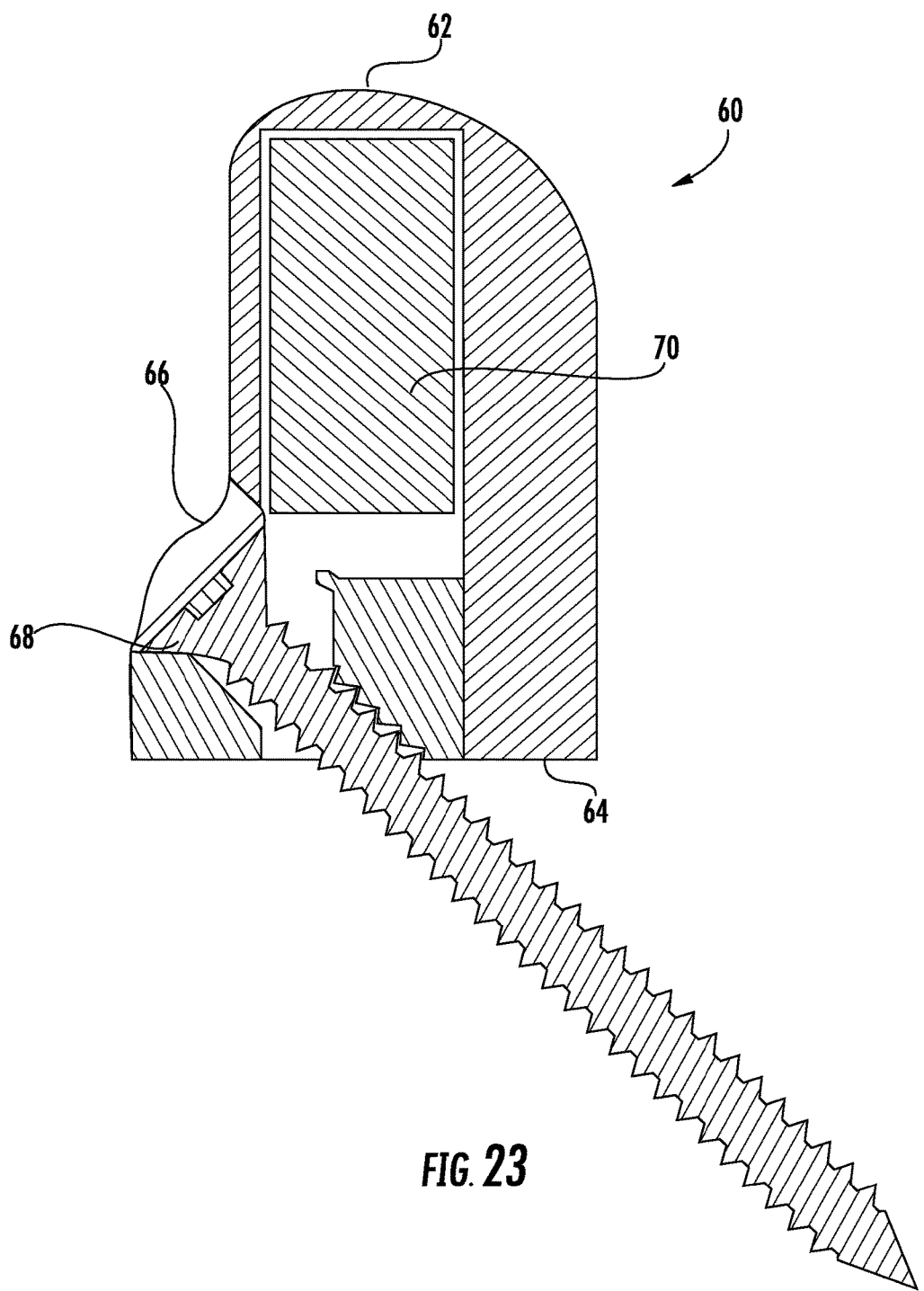
FIG. 23 is a longitudinal cross-section view of the catch as shown in FIG. 21.

Referring now to FIGS. 21-23, a second embodiment of a catch is shown and generally designated at 60. The catch 60 comprises an ovular member having a rounded top surface 62 and a planar bottom surface 64. A lower portion of the catch 60 includes a shoulder 66 defining an opening through the bottom surface 64 for receiving a threaded fastener 68. The catch 60 defines an internal cavity for accommodating a magnet 70.

Figure 26:
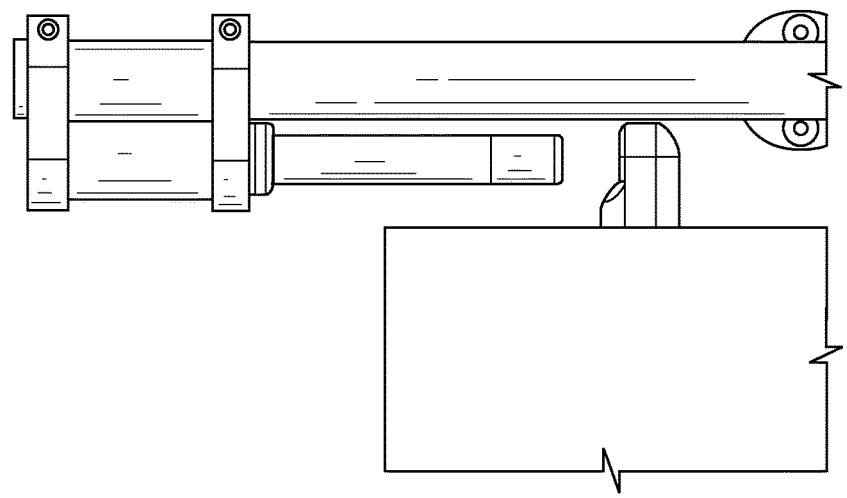
FIG. 26 is a front elevation view of the soft-stop device at the left end position of the door panel as shown in FIG. 2 including the catch as shown in FIG. 21.

As shown in FIGS. 24-26, the catch 60 is configured to be mounted directly to a door panel by inserting the fastener 70 through the catch 60 and into the surface of the door panel. The catch 60 is positioned on the door panel 60 such that, in an end position of the door panel, the catch 60 is adjacent to the distal end of the piston case 38. In use, the door panel-mounted catch 60 contacts the soft-stop device 10. As the door panel 100 continues moving, the soft-stop device 10 moves from the first extended position to a second compressed position as force created by the moving door panel 100 is exerted upon the piston 14. The piston rod 34 is forced into the cylinder 16 causing the spring 18 to compress and creating a resistive force against the force exerted by the moving door panel 100 for damping and slowing the movement of the door panel. In an embodiment wherein the catch 60 includes a magnet 70, as the catch 60 contacts the cap 40 on the end of the piston case 38 the magnets 42, 70 engage for holding the door panel in engagement with the soft-stop device 10. The soft-stop device 10 thus serves to capture the catch 60 when brought into close proximity with the soft-stop device 10 as the door panel 100 is moved to the end position. The soft-stop device 10 holds the door in this end position until pulled away by a user. The catch 60 in association with the soft-stop device 10 is particularly advantageous in a retrofit situation as the catch 60 may be secured directly to the door.

Figure 27:
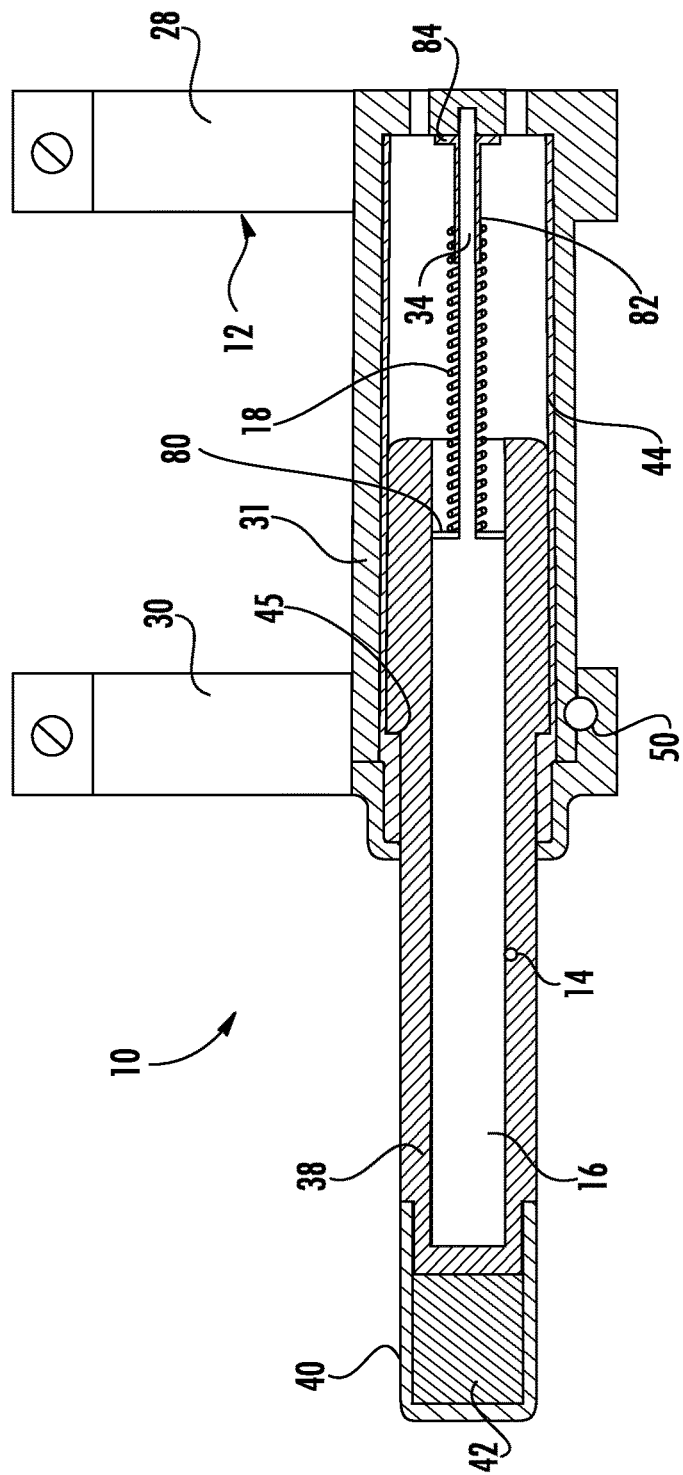
FIG. 27 is a longitudinal cross-section view of another embodiment of the soft-stop device as shown in FIG. 4 showing the soft-stop device in a first extended position.

FIG. 27 shows an embodiment of a soft-stop device 10 including a spring washer 80 at an outer end of the compression spring 18 adjacent the piston cylinder 16 and a retention shoulder 82 at the inner end of the compression spring 18. The spring washer 80 fits over the piston rod 34 between the spring 18 and the cylinder 16. In this arrangement, the spring washer 80 prevents the spring 18 from damaging the piston 14.

The retention shoulder 82 is an elongated hollow tubular element having a radially flared base 84. The retention shoulder 82 is configured to receive the inner end of the piston rod 34. The base 84 of the retention shoulder 82 sits against the inner surface of the closed end of the extension 31 of the rear mounting clamp 28. The retention shoulder 82 prevents the spring 18 from binding and flexing at the binding points which can lead to breakage. This is caused by the spring 18 rebounding to the end of the case faster than the piston rod 34. If this occurs, the piston rod 34 can extend between the coils of the spring 18 causing a binding point. The retention shoulder 82 maintains the spring 18 on the piston rod 34 thereby preventing the piston rod 34 from getting between the coils of the spring 18.

The various embodiments of the soft-stop device 10 described herein may have application to many other areas using rolling or sliding doors or other equipment, including furniture, cabinetry, vehicles such as cars, trucks, vans, buses, trains, aircraft, boat, motor vehicles or the like. In particular, the soft-stop device is directed to dampen and slow down and stop the movement of a moving component. As will further be readily apparent, the soft-stop device can be adapted for use on all types of doors and is not limited to use on residential household or commercial doors for ingress or egress. For example, the device can be used on kitchen or household appliances such as refrigerators and microwaves and all types of items that allow a person access to an interior portion thereof through some type of rolling or sliding door-like or lid type structure.

Although the soft-stop device has been shown and described in considerable detail with respect to only a few exemplary embodiments thereof, it should be understood by those skilled in the art that we do not intend to limit the soft-stop device to the embodiments since various modifications, omissions and additions may be made to the disclosed embodiments without materially departing from the novel teachings and advantages, particularly in light of the foregoing teachings. Accordingly, we intend to cover all such modifications, omission, additions and equivalents as may be included within the spirit and scope of the soft-stop device as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. A damping system, comprising:
   an elongated rail configured to support a door for sliding along the rail; and
   a damping apparatus mounted to the rail for damping movement of the door along the rail, the damping apparatus comprising:
      a base defining a chamber having a closed end and an open end, the base configured to secure the damping apparatus to the rail,
      a piston case slidably mounted for reciprocal movement in the chamber and extending from the open end of the base in a first position, and
      a piston slidably mounted for reciprocal movement in the piston case, the piston including:
         a cylinder,
         a piston head moveable within said cylinder,
         a piston rod connected to the piston head, and
         a compression spring disposed on the piston rod between the cylinder and the closed end of the chamber,
   wherein the damping apparatus is configured to engage the door in the first position and the piston slows movement of the door in a first direction along the rail with a first damping resistance as the piston and the piston case are moved along the first direction from the first position to a second position where the compression spring is engaged for compression that slows the movement of the door in the first direction along the rail with a second damping resistance, wherein the second damping resistance is greater than the first damping resistance.

2. The damping system as recited in claim 1, further comprising a roller assembly mounted to the door, the roller assembly including a roller configured to run on the rail.

3. The damping system as recited in claim 1, further comprising a catch secured to a roller assembly or the door, the catch arranged to engage the piston case.

4. The damping system as recited in claim 3, further comprising a first magnet attached to the piston case, and a second magnet attached to the catch, wherein the first magnet and the second magnet are oriented such that like poles are not facing each other and operate to create an attractive force as the magnets are move toward one another for holding the door engaged with the damping apparatus.

5. The damping system as recited in claim 1, wherein the base comprises a plurality of brackets mounted to the rail in longitudinally spaced relationship.

6. The damping system as recited in claim 1, wherein the compression urges the piston to the first position.

7. The damping system as recited in claim 1, further comprising a first magnet attached to the piston case, and a second magnet attached to the door, wherein the first magnet and the second magnet are oriented such that like poles are not facing each other and operate to create an attractive force as the magnets are move toward one another for holding the door engaged with the damping apparatus.

8. The damping system as recited in claim 7, wherein the first magnet and the second magnet are substantially adjacent to one another at the second position.

9. The damping system as recited in claim 1, wherein the damping apparatus comprises a plurality of damping devices.

10. The damping system as recited in claim 1, wherein the chamber has at least one perforation operable to allow air to escape from the chamber.

11. The damping system as recited in claim 1, wherein the piston is a pneumatic device and the cylinder accommodates a pneumatic medium as an operating fluid to cause fluid damping.

12. The damping system as recited in claim 11, wherein the pneumatic medium is air.

13. The damping system as recited in claim 1, wherein the piston is a hydraulic device and the cylinder accommodates a hydraulic medium as an operating fluid to cause fluid damping.

14. The damping system as recited in claim 1, further comprising a sleeve disposed in the chamber for guiding displacement of the piston rod, the sleeve including an annular skirt.

15. The damping system of claim 1, wherein the second damping resistance is a combination of the first damping resistance provided by the piston and a damping resistance provided by the compression spring.

16. A damping device for use with a door operably connected to a rail for movement along the rail in a first direction, the damping device damping movement of the door along the rail at an end position, the damping device comprising:
   a base defining a chamber having a closed end and an open end, the base configured to secure the damping device to the rail such that the chamber extends parallel to the rail along the first direction,
   a piston case slidably mounted for reciprocal movement in the chamber and extending from the open end of the base in a first position, and
   a piston slidably mounted for reciprocal movement in the piston case, the piston including:
      a cylinder,
      a piston head moveable within said cylinder,
      a piston rod connected to the piston head, and
      a compression spring disposed on the piston rod between the cylinder and the closed end of the chamber,
   wherein the damping device is configured to engage with the door in the first position and the piston slows movement of the door in the first direction along the rail with a first damping resistance as the piston and the piston case are moved along the first direction from the first position to a second position where the compression spring is engaged for compression that slows movement of the door in the first direction along the rail with a second damping resistance, wherein the second damping resistance is greater than the first damping resistance.

17. The damping device as recited in claim 16, wherein the cylinder has one or more perforations operable to allow air to escape from the chamber.

18. The damping device as recited in claim 16, wherein the damping device is a pneumatic device and the cylinder accommodates a pneumatic medium as an operating fluid to cause fluid damping.

19. The damping device as recited in claim 16, wherein the piston is a hydraulic device and the cylinder accommodates a hydraulic medium as an operating fluid to cause fluid damping.

20. The damping device as recited in claim 16, further comprising a sleeve in the chamber for guiding displacement of the piston rod, the sleeve comprising an annular skirt.

21. The damping device as recited in claim 16, further comprising a first magnet attached to the piston case, and a second magnet attached to the door, wherein the first magnet and the second magnet are oriented such that like poles are not facing each other and operate to create an attractive force as the magnets are move toward one another for holding the door engaged with the damping apparatus.

* * * * *